US011399453B2

(12) United States Patent
Preimess et al.

(10) Patent No.: US 11,399,453 B2
(45) Date of Patent: Aug. 2, 2022

(54) AGRICULTURAL SOIL CULTIVATION UNIT

(71) Applicant: POTTINGER LANDTECHNIK GMBH, Grieskirchen (AT)

(72) Inventors: Hans-Jorg Preimess, Grieskirchen (AT); Friedrich Baldinger, Grieskirchen (AT); Martin Kaltseis, Grieskirchen (AT); Wilhelm Meindlhumer, Grieskirchen (AT)

(73) Assignee: POTTINGER LANDTECHNIK GMBH, Grieskirchen (AT)

( * ) Notice: Subject to any disclaimer, the term of this patent is extended or adjusted under 35 U.S.C. 154(b) by 337 days.

(21) Appl. No.: 16/607,598

(22) PCT Filed: Apr. 24, 2018

(86) PCT No.: PCT/EP2018/060491
§ 371 (c)(1),
(2) Date: Oct. 23, 2019

(87) PCT Pub. No.: WO2018/197505
PCT Pub. Date: Nov. 1, 2018

(65) Prior Publication Data
US 2020/0093052 A1 Mar. 26, 2020

(30) Foreign Application Priority Data

Apr. 24, 2017 (DE) .................. 10 2017 003 951.8
Sep. 13, 2017 (DE) .................. 10 2017 121 152.7

(51) Int. Cl.
*A01B 63/111* (2006.01)
*A01B 15/16* (2006.01)
(Continued)

(52) U.S. Cl.
CPC ............ *A01B 63/111* (2013.01); *A01B 15/16* (2013.01); *A01B 21/08* (2013.01); *A01B 63/24* (2013.01)

(58) Field of Classification Search
CPC ....... A01B 63/24; A01B 63/112; A01B 15/16; A01B 21/08
See application file for complete search history.

(56) References Cited

U.S. PATENT DOCUMENTS 3,132,699 A * 5/1964 Brudnak, Jr. ......... A01B 63/111
172/9
3,220,485 A * 11/1965 Cassani ............... A01B 63/1117
172/9
(Continued)

FOREIGN PATENT DOCUMENTS

CN 105009719 A 11/2015
DE 10236827 A1 2/2004
(Continued)

OTHER PUBLICATIONS

English translation of International Search Report and Written Opinion for related PCT/EP2018/060491 dated Aug. 21, 2018.
(Continued)

*Primary Examiner* — Jessica H Lutz
(74) *Attorney, Agent, or Firm* — Troutman Pepper Hamilton Sanders LLP; Scott A. Bergeson

(57) ABSTRACT

An agricultural soil cultivation unit having at least two rows of soil working tools that are fastened to a tool carrying frame that is pivotably supported about a horizontal frame pivot axis at a machine frame supported by a chassis on the ground and liftable by a lifting apparatus into a headland position and/or transport position. It is therefore proposed in accordance with an aspect of the invention to change the working depth setting of the soil working tool rows relative to one another online in working operation to hereby be able (Continued)

Figure 1:
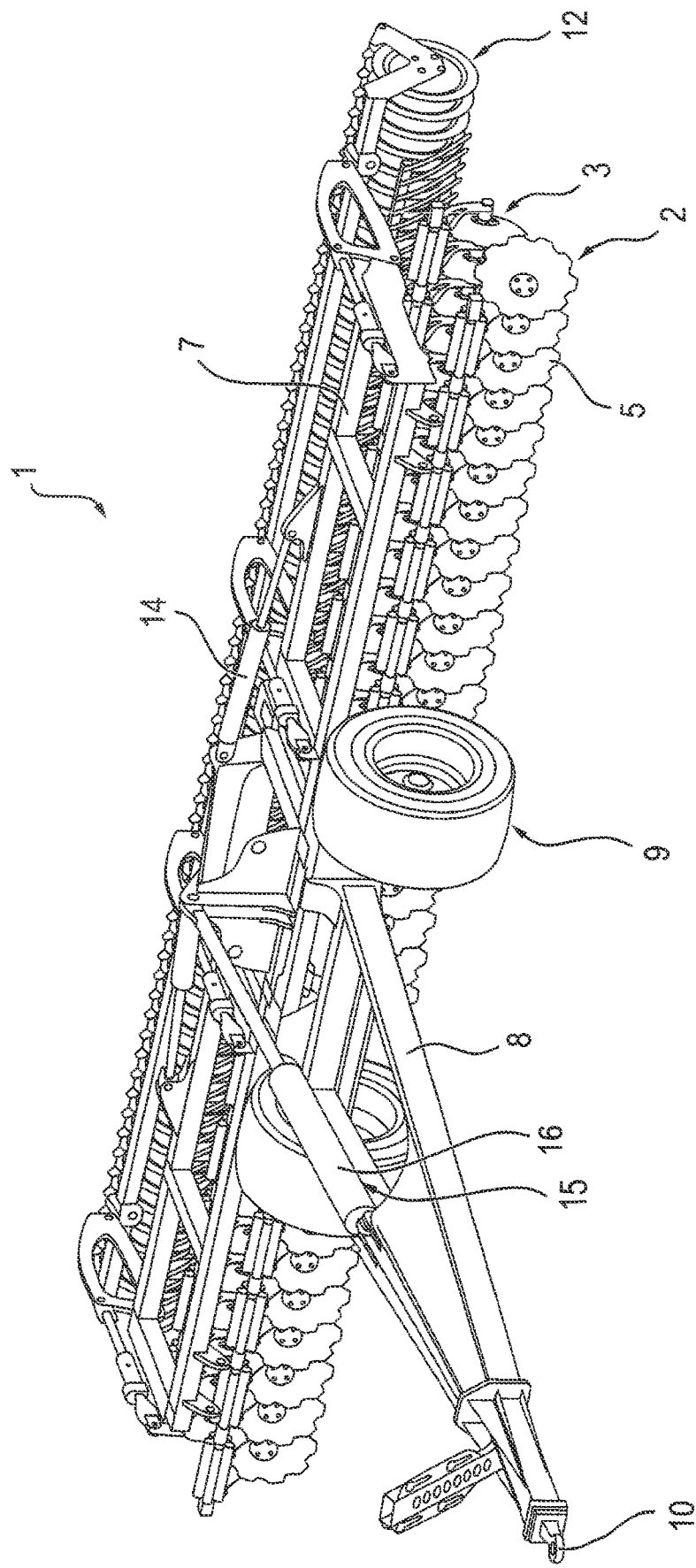

to react to changing soil conditions in working operation and to be able to mutually compensate resulting side forces of the soil working tools.

12 Claims, 4 Drawing Sheets

(51) Int. Cl.
*A01B 21/08* (2006.01)
*A01B 63/24* (2006.01)

(56) References Cited

U.S. PATENT DOCUMENTS

| | | | | |
|---|---|---|---|---|
| 3,275,084 A * | 9/1966 | Ernest | | B62D 49/02 |
| | | | | 172/9 |
| 3,844,357 A * | 10/1974 | Ellinger | | A01B 63/1115 |
| | | | | 172/4 |
| 4,209,067 A * | 6/1980 | Poggemiller | | A01B 21/08 |
| | | | | 172/190 |
| 4,434,857 A * | 3/1984 | Basrai | | A01B 63/22 |
| | | | | 172/328 |
| 4,932,476 A * | 6/1990 | Hoehn | | A01B 21/08 |
| | | | | 116/281 |
| 5,152,347 A * | 10/1992 | Miller | | A01B 63/1117 |
| | | | | 172/316 |
| 6,119,786 A * | 9/2000 | Creger | | A01B 63/1115 |
| | | | | 172/7 |
| 6,318,477 B1 * | 11/2001 | Betti | | A01B 63/32 |
| | | | | 172/452 |
| 6,397,953 B1 * | 6/2002 | Ankenman | | A01B 51/04 |
| | | | | 172/445.1 |
| 8,235,130 B2 | 8/2012 | James | | |
| 8,573,319 B1 * | 11/2013 | Casper | | A01B 63/114 |
| | | | | 172/4 |
| 9,253,937 B2 * | 2/2016 | Horsch | | A01B 73/048 |
| 9,370,137 B2 * | 6/2016 | Hennes | | A01B 23/046 |
| 9,609,797 B2 * | 4/2017 | Dietrich, Sr. | | A01B 61/044 |
| 9,655,296 B2 * | 5/2017 | Beaujot | | A01B 61/00 |
| 9,788,473 B2 * | 10/2017 | Tobin | | A01C 7/203 |
| 9,936,621 B2 * | 4/2018 | Degel | | A01B 29/048 |
| 10,280,948 B2 * | 5/2019 | Vigholm | | F15B 11/16 |
| 10,687,453 B2 * | 6/2020 | Stark | | A01B 49/02 |
| 10,813,264 B2 * | 10/2020 | Wu | | A01B 63/111 |
| 10,881,043 B2 * | 1/2021 | Bauer | | A01B 63/1117 |
| 10,912,244 B2 * | 2/2021 | Kilby | | A01B 59/004 |
| 10,959,367 B2 * | 3/2021 | Zemenchik | | A01B 79/005 |
| 2014/0048295 A1 | 2/2014 | Bassett | | |
| 2019/0166753 A1 * | 6/2019 | Hoffman | | A01B 79/005 |
| 2020/0288620 A1 * | 9/2020 | Chwialkowski | | A01B 63/008 |
| 2021/0153420 A1 * | 5/2021 | Smith | | A01B 63/24 |

FOREIGN PATENT DOCUMENTS

| | | |
|---|---|---|
| DE | 102016217593 A1 | 3/2017 |
| EP | 2911495 A1 | 9/2015 |

OTHER PUBLICATIONS

English translation of Written Opinion for related PCT/EP2018/060491 dated Aug. 21, 2018.

* cited by examiner

AGRICULTURAL SOIL CULTIVATION UNIT

The present invention relates to an agricultural soil cultivation unit having at least two rows of soil working tools that are fastened to a tool carrying frame that is pivotably supported about a horizontal frame pivot axis at a machine frame supported by a chassis on the ground and liftable by a lifting apparatus into a headland position and/or transport position.

Such an agricultural soil cultivation unit can in particular be configured as an attachment item that is attachable to a tractor and is pulled by it. To be able, on the one hand, to have large working widths, but on the other hand to observe the permitted dimensions for road transport or also to be able to configure the unit in more compact form only for non-working operation, the soil cultivation tools can be attached to a pivotable tool carrier frame that is pivotable with respect to the machine frame supported by a chassis on the ground. Said tool carrier frame can, for example, be lifted about a horizontal frame pivot axis extending transversely to the direction of travel from a horizontal, lowered working position into an approximately upright transport position, which can be effected, for example, by a lifting apparatus actuable by external energy, for example in the form of a pressure medium cylinder. Said tool carrier frame can here advantageously be divided into a plurality of segments that are foldable with respect to one another so that frame segments that project per se can be further inwardly folded in the transport position.

In working operation, a diagonal pull can arise with such soil cultivation units, wherein the chassis scrapes over the ground transversely to the actual direction of travel and the soil cultivation tools no longer work exactly in their actually intended orientation. Such a running-out-of-track here primarily results from unequal transverse forces at the tool rows that no longer mutually compensate one another. Soil cultivation tools such as coulter disks can be set at an acute angle obliquely to the direction of travel in accordance with their intended purpose so that on an operation in accordance with the intended purpose transverse forces transversely to the direction of travel result at the soil working tools. Such transverse forces should mutually cancel one another out when the soil working tools are set inclined at opposite directions to one another. Such an opposed setting of the soil working tools is per se not primarily provided due to said compensation of the transverse forces, but to achieve a better, more intensive soil cultivation. If, for example, the coulter disks of a leading soil working tool row are set slightly to the left with respect to the direction of travel and if the coulter disks of a trailing second soil working tool row are set slightly to the right with respect to the direction of travel, an improved soil loosening and mixing of the soil as well as a better severing of the root system can be achieved. At the same time, the transverse forces resulting from the oblique position compensate one another to a certain degree.

The balance of the transverse forces is, however, disrupted by unequal engagement conditions at the soil working tool rows. While the leading soil working tool row digs into the still unloosened, hard soil and accordingly causes high transverse forces, the trailing soil working tool row digs into soil that has already been at least partially loosened so that smaller transverse forces result.

It has therefore already been contemplated to eliminate said imbalance of the transverse forces in that the soil working tool rows are traveled at different working depths. If the trailing soil working tool row travels in a somewhat larger working depth, larger transverse forces or transverse forces that are just as large as at the leading soil working tool row that digs into a smaller working depth in the unloosened soil can be achieved so that a diagonal pull with a scraping chassis can be avoided. It is, however, difficult to find the exactly matching working dept setting that avoids a diagonal pull of the soil cultivation unit as much as possible since the transverse forces resulting at the soil working tool can depend on different conditions and finding the matching setting thus becomes very complex. For example, the working depth itself and also different soil qualities influence the resulting transverse pull so that the trailing soil working tool row has once to be set lower by a larger degree and once by a smaller degree than the leading row.

The adjustment of the matching working depths of the soil working tool rows is here not only complex to date, but also laborious. The machine operator typically has to dismount from the tractor and adjust the tool rows via adjustment spindles and the like, which then in turn has to be done again when the soil conditions change.

Conventional working depth adjustment devices can to date only insufficiently address said problem since they admittedly change the working depth of the soil working tool rows, but do not sufficiently compensate the transverse forces and thus cannot eliminate a diagonal pull of the unit. A laboriously found depth setting can in particular be displaced when the tool rows are lifted in the headland and are subsequently lowered again.

Starting from this, it is the underlying object of the present invention to provide an improved agricultural soil cultivation unit of the named type which avoids the disadvantages of the prior art and further develops the latter in an advantageous manner. A diagonal pull of the soil cultivation unit should also in particular be able to be avoided even under changing soil conditions with simple means in a comfortable manner.

The named object is achieved in accordance with the invention by an agricultural soil cultivation unit in accordance with claim 1. Preferred embodiments of the invention are the subject of the dependent claims.

It is therefore proposed in accordance with an aspect of the invention to change the work depth setting of the soil working tool rows relative to one another online in working operation to hereby be able to react to changing soil conditions in working operation and to be able to mutually compensate resulting side forces of the soil working tools. In accordance with the invention, the soil working tool rows are adjustable in their vertical positions relative to one another in the lowered working position and the ratio of the working depths of the soil working tool rows with respect to one another are adjustable by an adjustment device that can be actuated without tools in working operation and that is provided with an actuator actuable by external energy. Unlike conventional working depth adjustment devices, said adjustment apparatus cannot only adjust the absolute working depth of both soil working tool rows, but also the relative position of the soil working tool rows with respect to one another and thus the working depth difference of the two soil working tool rows, for example the working depth of the trailing soil working tool row more than the working depth of the front soil working tool row and/or the working depths of the soil working tool rows contrary to one another to hereby be able to change and compensate the side forces resulting at the soil working tool rows.

Said adjustment of the working depth difference can advantageously be provided in addition to a setting of the absolute working depth, with said setting apparatus advantageously being provided to enable the vertical positionings of the soil working tool rows relative to one another online from a tractor.

In a simpler embodiment of the invention, said setting apparatus can be actuable manually by the tractor driver or machine operator to enable a compensation of the transverse pull by an interaction with the adjustment apparatus and the ratio of the working depths. The machine operator frequently senses or sees a transverse pull of the soil cultivation unit, for example by a slight scraping of the chassis, so that he can counter it by a manual actuation of the setting apparatus from the tractor.

In an advantageous further development of the invention, the actuation of the setting apparatus can take place in an automated manner, either semiautomatically or fully automatically. A control apparatus can in particular automatically provide a control signal by means of which the setting apparatus can be actuated. Said control signal can here, for example, be displayed on a display or on other display means so that the machine operator can then accordingly actuate the setting apparatus. With a fully automatic configuration, said control signal can also be provided directly to the setting apparatus so that it then initiates a corresponding adjustment movement using the control signal.

Said control apparatus can here work in dependence on an operating parameter relevant to the diagonal pull and can for this purpose be connected to suitable detection means that detect such an operating parameter relevant to the diagonal pull.

Said detection means can in particular have an angle sensor that detects an engagement angle of the machine frame of the soil cultivation unit with respect to an upright plane in parallel with the direction of travel and/or with respect to a pulling tractor. If the machine frame is, for example, hitched to the tractor via a shaft and/or is fastened to an attachment block pivotably about an upright axis, the pivot angle of the shaft or the pivot angle with respect to the attachment block can be used as a measure for the diagonal pull.

Alternatively or additionally, said detection means can also detect the transverse forces adopted at the soil cultivation unit as operating parameters relevant to the diagonal pull that act transversely to the direction of travel and effect a diagonal pull. For example, a load sensor can detect the transverse force that the tool carrying frame exerts on the machine frame and/or a transverse force that the soil working tool rows each exert on the tool carrier frame. In this respect, forces acting transversely to the direction of travel or bending torques thereby induced on the tool carriers, for example, can be detected here as transverse load and can be used as a measure for the adopted diagonal pull.

Alternatively or additionally, said detection means can also have a speed sensor that can be provided at the attachment item itself or at the tractor to determine the travel speed. The control apparatus can adapt the control signal for the control of the adjustment apparatus with reference to the speed signal, for example such that at higher travel speeds a greater working depth difference is provided at the soil working tool rows and at smaller travel speeds a smaller working depth difference is provided at the soil working tool rows.

Alternatively or in addition to the taking account of the travel speed, the control apparatus can also take account of the working depth of the soil working tools themselves, with the detection means being able to detect the absolute working depth of at least one of the two soil working tool rows by means of a suitable sensor system. The control apparatus can then adapt the working depth difference between the soil working tool rows to the absolute working depth, for example such that with a greater absolute working depth a large working depth difference is provided between the two soil working tool rows to also obtain a comparable transverse load at the trailing soil working tool row as at the leading tool row.

Alternatively or in addition to a control using a feedback loop and a detection of the actually adopted diagonal pull or of a corresponding operating parameter relevant to the diagonal pull, the control apparatus can also be configured as a precontrol or can have a corresponding precontrol module. The control apparatus can in particular comprise selection means by means of which a machine operator can preselect relevant operating parameters with reference to which a presetting means then presets the adjustment signal. Said selection means can here in particular select at least one operating parameter from the group soil quality, soil hardness, soil moisture, or engagement angle of the soil working tools so that the machine operator, for example, only selects the value "soil hard" or "soil medium hard", or "soil soft" and the presetting means provide a matching adjustment signal with reference to which the setting apparatus then sets the relative vertical setting of the soil working tool rows relative to one another semiautomatically or automatically.

Instead of or in addition to a manual actuation of said selection means by the machine operator, an automated configuration of the selection means can also be provided, with said selection means being able to work in dependence on detected sensor data. A soil sensor and/or a soil hardness sensor can, for example, be provided to detect the soil moisture and/or the soil hardness so that then a presetting of the relative vertical position of the soil working tool rows relative to one another is carried out instead of the soil property detected by a sensor.

In an advantageous further development of the invention, the vertical position of the soil working tool rows relative to one another and thus the working depth difference between the soil working tool rows is effected via an inclination adjustment of the tool carrier frame. If the tool carrier frame is tilted about its carrier frame pivot axis, the soil working tool row spaced further apart from the carrier frame axis is adjusted more in height than a tool row disposed closer to the pivot axis. Said tool carrier frame can advantageously be supported at a front end section pivotably about said carrier frame pivot axis, with the frame pivot axis being able to be arranged, for example, at a rear-side end of a main frame and/or at a front-side end of the tool carrier frame. If the tool carrier frame is tilted a little further downwardly in its horizontal working position, the rear tool row is pressed more into the soil than the front soil working tool row. The transverse pull of the soil working tool rows can accordingly be adjusted by tilting the tool carrier frame.

The aforesaid setting apparatus advantageously comprises an actuator for tilting the tool carrier frame and/or for setting the tilt position of the tool carrier frame.

In an advantageous further development of the invention, said actuator can form a pivot drive by means of which said tool carrier frame can be tilted about its frame pivot axis, with said pivot drive advantageously being configured such that different tilt positions can be fixedly set. The pivot drive can advantageously have the quality that the desired tilt position of the tool carrier frame to be traveled to can be continuously varied or set.

To achieve a compact configuration that has a small design and is simple to provide with energy, the actuator of the setting apparatus can advantageously be integrated in the lifting apparatus or in the lifting drive for lifting the tool carrier frame into the headland position and/or transport position.

Said lifting apparatus for lifting the tool carrier frame and the soil working tool rows fastened thereto into the headland position and/or transport position can advantageously comprise a pressure medium cylinder, for example in the form of a hydraulic cylinder, that can be connected in an articulated manner to the tool carrier frame to be lifted, on the one hand, and to a main frame or to an element connected thereto and fixed to the main frame, on the other hand, to pivot the tool carrier frame about its frame pivot axis.

If the lift drive has such a pressure medium cylinder, the aforesaid actuator of the setting apparatus can in an advantageous further development of the invention, be integrated in or provided at said pressure medium cylinder and can form an adjustable abutment that sets an end position of the pressure medium cylinder of the lifting apparatus and thus sets the tilt position of the tool carrier frame, with said abutment being adjustable to be able to predefine different tilt positions.

The actuator of the setting apparatus forming the abutment for the lifting cylinder can here in particular be configured in the form of a second piston that can be arranged floating in the pressure medium cylinder of the lifting apparatus. Said second floating piston can in particular be configured as a ring piston and can sit displaceably on the piston rod of the pressure medium cylinder of the lifting apparatus, with the spacing of this floating ring piston from the collar of the cylinder from which the piston rod emerges being able to be set by filling or draining the ring chamber between the floating ring piston and the cylinder collar. In the lowered working position, the main piston of the pressure medium cylinder unit of the lifting apparatus is traveled toward said floating piston, whereby the desired tilt position and thus the working depth difference is set.

If the tool carrier frame and the soil working tool rows fastened thereto are to be lifted in the headland or for transport, the second ring chamber of the pressure medium cylinder can be filled with pressure medium between the floating piston and the main piston to retract the piston rod. On a subsequent lowering of the tool carrier frame by extending the piston rod, the main piston in turn travels toward the floating piston whose previously set position has remained unchanged so that the previously adjusted working depth difference the compensation of the transverse forces is maintained after a further lowering from the headland.

Alternatively to such a ring piston supported in a floating manner, the actuator of the setting apparatus can also be configured in the form of a second piston that is fixed on the piston rod of the pressure medium cylinder of the lifting apparatus of the pressure medium cylinder of the lifting apparatus outside its cylinder and is accommodated in a second separate cylinder, which second separate cylinder can then form one of the two articulated connection points and can, for example, be connected in an articulated manner to the tool carrier frame or to the machine frame. The effective length of the pressure medium cylinder unit in the lifting apparatus can likewise be variably set in the fully extended position by this second separate cylinder and the desired inclination of the tool carrier frame can thus be adjusted.

Figure 2:
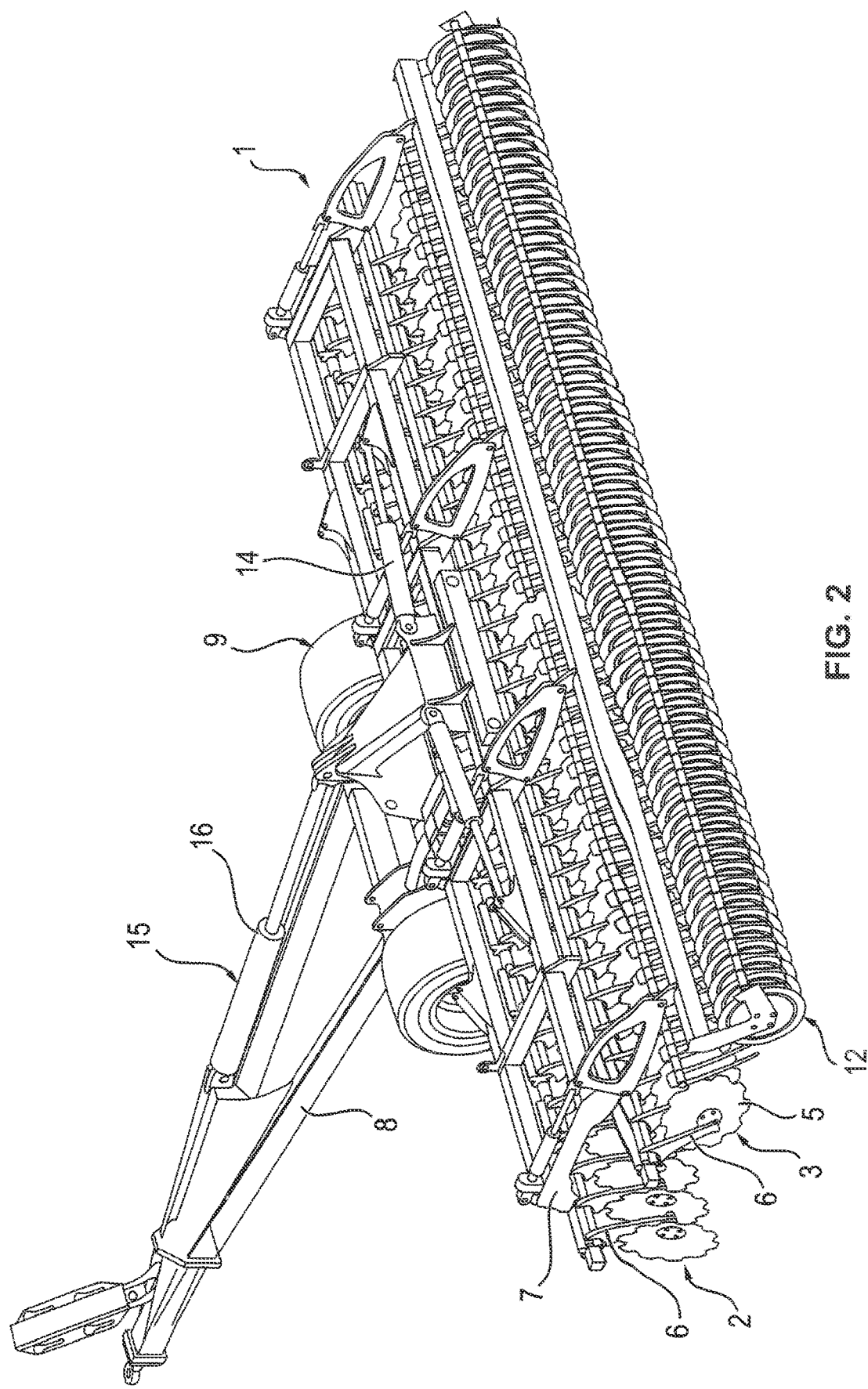
Figure 3:
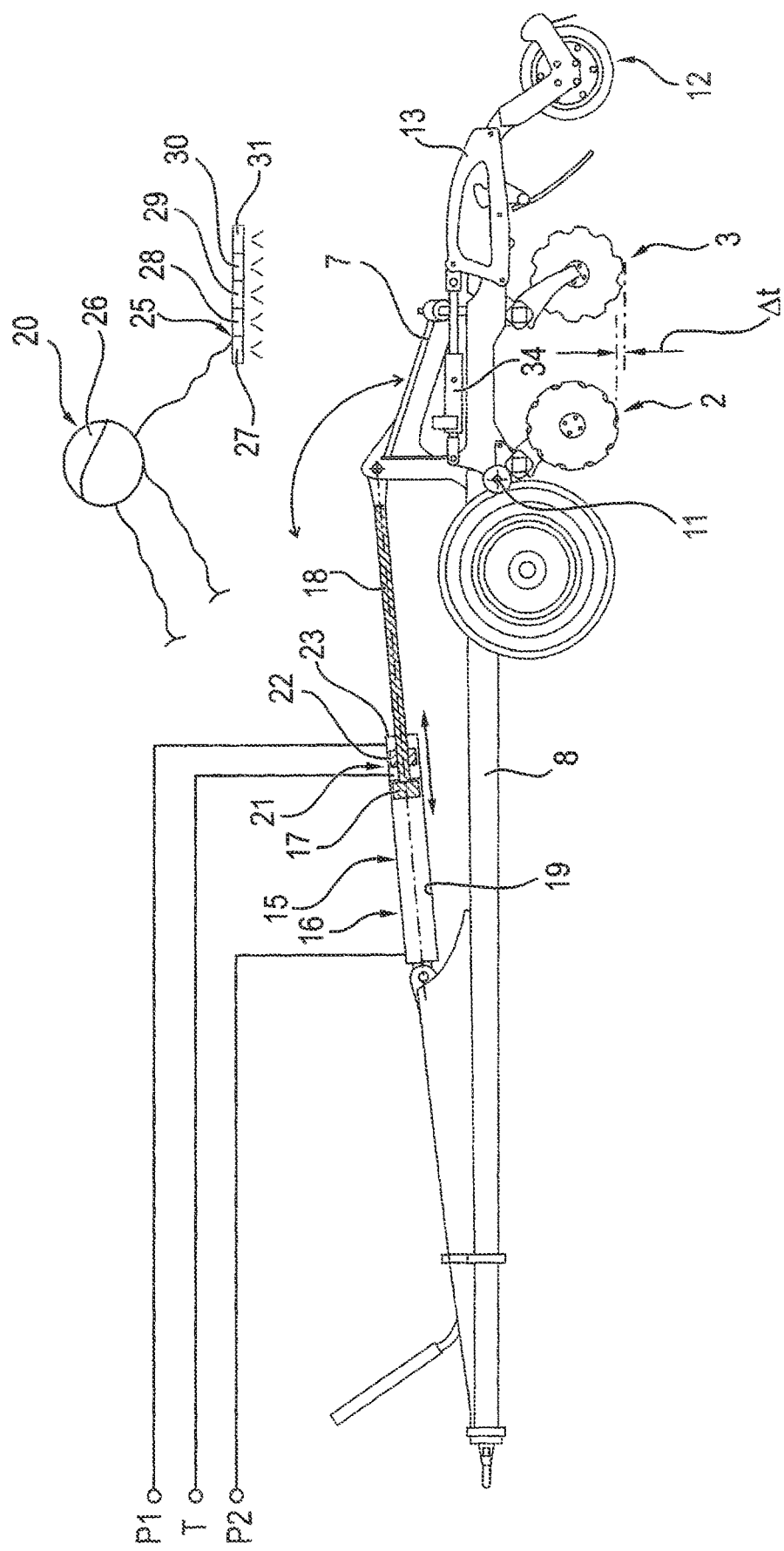
Figure 4:
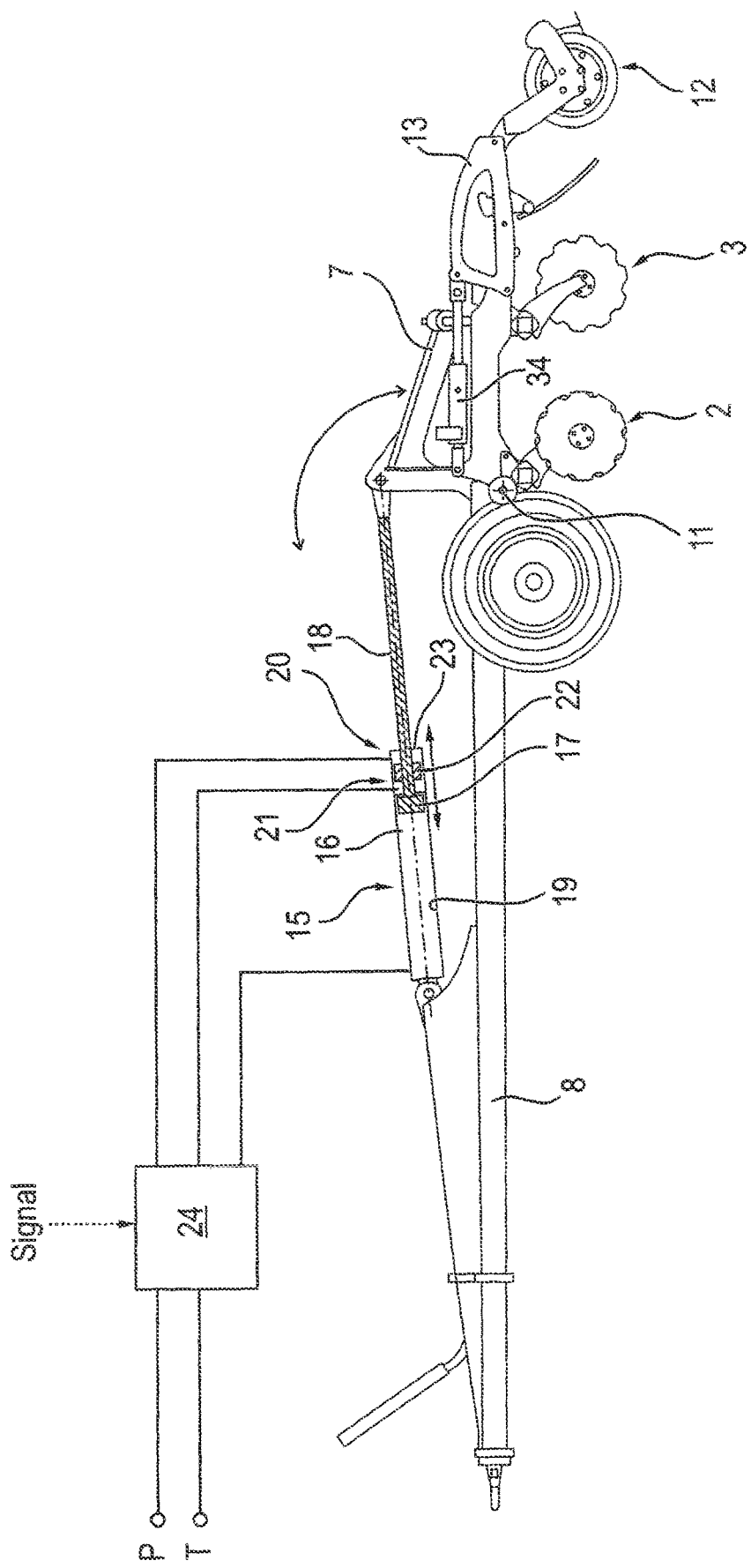

The invention will be explained in more detail in the following with reference to a preferred embodiment and to associated drawings. There are shown in the drawings:

FIG. 1: a schematic perspective representation of an agricultural soil cultivation unit in a direction of view obliquely from the front in accordance with an embodiment of the invention in which a tool carrier frame extending transversely to the direction of travel in the lowered working position is connected in an articulated manner to a machine frame pivotable about a horizontal transverse axis, said machine frame being supported by a chassis on the ground;

FIG. 2: a schematic perspective view of the soil cultivation unit of FIG. 1 in a direction of view obliquely from the rear;

FIG. 3: a schematic side view of the soil cultivation unit of FIGS. 1 and 2 that illustrates the pivotability of the tool carrier frame carrying the two soil working tool rows and shows the actuator of the setting apparatus that is configured as a floating ring piston and that is integrated in the lifting cylinder; and FIG. 4: a schematic side view of the soil cultivation unit similar to FIG. 3, with the control of the pressure medium cylinder unit taking place via a signal-controlled valve.

As the Figures show, the agricultural soil cultivation unit 1 can have two soil working tool rows 2 and 3 that each extend transversely to the direction of travel 4 and that run after one another in the direction of travel. Said tool rows 2 and 3 can here each comprise a plurality of soil working tools 5 that are arranged next to one another and that can each be fastened to or hung at a tool carrier frame 7 via a carrier arm 6. Said soil working tools 5 can generally be of different configurations, for example in the form of coulter disks, with the soil working tools 5 being able to be set slightly obliquely to the direction of travel 4. The soil working tools 5 of the leading tool row 2 are here advantageously set contrary to the soil working tools 5 of the trailing tool row 3, for example such that the soil working tools 5 of the leading tool row 2 are tilted slightly to the left and the soil working tools 5 of the trailing tool row 3 are tilted slightly to the right.

The longitudinal axis of said tool carrier frame 7 can extend transversely to the direction of travel 4 in the lowered working position that FIGS. 1 and 2 show and can be fastened to a machine frame 8 that can be supported via a chassis 9 on the ground and can be attached to a tractor via an attachment apparatus 10. The attachment apparatus 10 can here comprise a shaft or also an attachment block having a three-point hitch.

The tool carrier frame 7 can be connected in an articulated manner to said machine frame 8 pivotable about a horizontal frame pivot axis 11 extending transversely to the direction of travel 4 so that the tool carrier frame 7 can be lifted from a horizontal working position such as FIGS. 1 and 2 show into an upright transport position.

To be able to observe the permitted road width, said tool carrier frame 7 can be divided into different frame segments that can be foldable with respect to one another. For example, lateral frame segments 7l and 7r can be hinged to the front in the upright transport position of the tool carrier frame 7 to be approximately folded onto the machine frame 8. For this purpose, the frame segments can be connected to one another in an articulated manner and can be folded via folding cylinders 14, as is known per se.

As FIGS. 1 and 2 show, a further soil working tool row 12, for example in the form of the grooved roller shown in the Figures, can be fastened to or suspended at the tool carrier frame 7 in addition to the two tool rows 2 and 3, with the trailing unit or trailing soil working tool row 12 advantageously being able to be vertically adjustable with respect to the tool carrier frame 7 and thus to the two tool rows 2 and 3, in particular in that a trailing frame 13 is pivotable relative to the tool carrier frame 7 about a horizontal axis aligned transversely to the direction of travel, cf. FIG. 3. A bias and/or setting means 34, for example in the form of a pressure medium cylinder, can here influence the vertical position of the trailing soil working tool row 12, cf. FIG. 3. The trailing soil working tool row 12 can also comprise other soil working tools, for example in the form of spreads, cf. FIG. 3.

To be able to lift the tool carrier frame 7 with the soil working tool rows 2, 3, and 4 suspended thereat from the lowered working position shown in the Figures into a headland position or transport position, a lifting apparatus 15 actuable by external energy can be provided that can have a pressure medium cylinder 16 that can be pivotably connected in an articulated manner to the tool carrier frame 7, on the one hand, and in an articulated manner to the machine frame 8, on the other hand, cf. FIG. 3 and FIG. 4.

Said pressure medium cylinder 16 can here have a main piston 17 that is rigidly fastened to a piston rod 18 and is displaceably guided in a cylinder 19.

Depending on the installation situation of the pressure medium cylinder 16, it is extended or retracted in the lowered working position of the tool carrier frame 7, with FIGS. 3 and 4 showing an installation position in which the pressure medium cylinder 16 works as a lifting cylinder and is extended in the lowered working position of the tool carrier frame 7. In this process, the extended end position of the pressure medium cylinder 16 determines the tilt position or pivot position of the tool carrier frame 7 in the lowered working position.

To now be able to set the exact inclination of the tool carrier frame 7 in the lowered working position, a setting apparatus 20 is provided by means of which the end position of the pressure medium cylinder 16—that is completely extended or retracted in dependence on the installation situation—can be variably set. More precisely, it is possible to set by means of the setting apparatus 20 how far the piston rod 18 can be fully extended (or actually retracted depending on the installation situation).

Said setting apparatus 20 can in particular comprise an actuator 21 for this purpose that forms an adjustable abutment for the main piston 17, with said actuator 21 in particular being able to be configured in the form of a floating piston. If the completely extended position of the pressure medium cylinder 16 determines the inclination of the tool carrier frame 7 in the working position, said floating piston can be configured as a ring piston that is displaceably seated on the piston rod 18 and can be arranged between the main piston 17 and the cylinder collar at which the piston rod 18 exits the cylinder 19.

In addition to the setting apparatus, FIG. 3 illustrates a detection means 25 for detecting an operating parameter that is relevant to a diagonal pull and that characterizes a resulting diagonal pull of the soil working tools 5 transversely to the direction of travel 4 and a control apparatus 26 is provided for an automatic provision of a control signal to actuate the setting apparatus 20 depending on the detected operating parameter relevant to the diagonal pull. The detection means 25 may include an angle sensor 27 for detecting an angle of the machine frame 8 relative to the direction of travel 4 and/or relative to a tractor to which the agricultural soil cultivation unit is attached. The control apparatus 26 may be configured to provide the control signal depending on the detected angle. The detection means 25 may include a transverse load sensor 28 for detecting a transverse pull of the tool carrier frame 7 on the machine frame 8 transversely to the direction of travel 4 and/or for detecting a transverse pull of the tool rows 2, 3 on the tool carrier frame 7 transversely to the direction of travel. The control apparatus 26 may be configured to provide the control signal depending on the detected transverse load. The detection means 25 may include a speed sensor 29 for detecting the travel speed. The control apparatus 26 may be configured to provide the control signal depending on the detected travel speed. The detection means 25 may include a working depth sensor 30 for detecting the working depth of the soil working tools 5 of one of the tool rows 2, 3. The control apparatus 26 may be configured to provide and/or to vary the control signal depending on on the detected working depth. The detection means 25 may include a soil quality sensor 31 for detecting a soil quality, in particular a soil hardness or soil moisture. The control apparatus 26 may be configured to provide and/or to vary the control signal depending on the detected soil quality If pressure medium is filled into the ring chamber between the floating piston 22 and the cylinder collar 23, the floating piston 22 cannot travel directly up to the cylinder collar 23, but rather maintains a certain spacing therefrom. The piston rod 18 can accordingly also no longer extend fully with the main piston 17, i.e. by adjusting the position of the floating piston 22 from the cylinder collar 23, the end position of the main piston 17 and thus the completely extended length of the piston rod 18 can be set.

Pressure medium can be filled into the second ring chamber between the floating piston 22 and the main piston 177 for the retraction of the piston rod 18 to lift the tool carrier frame 7.

Conversely, the ring chamber between the floating piston 22 and the main piston 17 can also be filled for the adjustment of the end position, with then the other ring chamber between the floating piston 22 and the cylinder collar 23 being filled with pressure medium to retract the piston rod 18 and to lift the tool carrier frame 7.

With a converse installation situation of the pressure medium cylinder 16 in which the pressure medium cylinder 16 does not pull to lift the tool carrier frame 7, but rather presses and would be retracted in the lowered working position of the tool carrier frame 7, said floating piston 22 cannot be seated floating on the ring side on the piston rod 18, but rather on the other side of the main piston 17 in the larger cylinder chamber. The setting of the end position can then take place in an analog manner here.

As FIG. 4 shows, the system can also work with only one pressure connection and one return connection, with then a pressure control valve 24 being able to distribute and control the pressure coming from the pressure connection P to the respective cylinder chambers of the pressure medium cylinder 16 to be able to retract and extend the pressure medium cylinder 16 in a corresponding manner and to be able to travel the floating piston 22 into the desired position.

The pressure medium cylinder 16 can here generally be configured as single-acting and can only be retractable in the installation position shown in FIGS. 3 and 4 actuable by external energy, for example. Said pressure medium cylinder 16 can, however, advantageously be configured as dual-acting so that the piston rod 18 can be both retracted and extended in a manner actuated by pressure medium. The tool carrier frame 7 can hereby be both upwardly lifted and downwardly traveled to press the soil working tool rows 2 and 3 actively onto the ground.

As can be seen from FIGS. 3 and 4, the inclination of the tool carrier frame 7 aligned approximately horizontally in the working position determines the working depth difference of the two tool rows 2 and 3. Since the leading tool row 2 is arranged closer to the frame pivot axis 11 than the trailing tool row 3, inclination and tilt movements of the tool carrier frame 7 result in a smaller vertical adjustment movement at the leading tool row 2 than at the rear tool row 3. If therefore the inclination of the tool frame 7 is slightly adjusted in the lowered working position, the working depth difference of the two tool rows 2 and 3 is varied and adjusted so that the transverse loads adopted in the initially explained manner at the tool rows 2 and 3 can be varied and thus compensated with respect to one another.

The invention claimed is:

1. An agricultural soil cultivation unit comprising:
   at least two rows of soil working tools that are fastened to a tool carrier frame that is pivotably supported about a horizontal frame pivot axis at a machine frame supported by a chassis on the ground and is liftable by a lifting apparatus (15), characterized in that vertical positions of the soil working tool rows are adjustable relative to one another in a lowered working position, and a working depth difference between the at least two rows of the soil working tools is thus adjustable by a setting apparatus actuable without the tools in working operation and having an actuator actuable by external energy,
   wherein detection means are provided for detecting an operating parameter that is relevant to a diagonal pull and that characterizes a resulting diagonal pull of the soil working tools transversely to the direction of travel and a control apparatus is provided for an automatic provision of a control signal to actuate the setting apparatus depending on the detected operating parameter relevant to the diagonal pull.

2. The agricultural soil cultivation unit in accordance with claim 1,
   wherein the detection means comprise an angle sensor for detecting an angle of the machine frame relative to the direction of travel and/or relative to a tractor to which the agricultural soil cultivation unit is attached; and wherein the control apparatus is configured to provide the control signal depending on the detected angle.

3. The agricultural soil cultivation unit in accordance with claim 2, wherein the detection means comprise a transverse load sensor for detecting a transverse pull of the tool carrier frame on the machine frame transversely to the direction of travel and/or for detecting a transverse pull of the tool rows on the tool carrier frame transversely to the direction of travel; and wherein the control apparatus is configured to provide the control signal depending on the detected transverse load.

4. The agricultural soil cultivation unit in accordance with claim 1, wherein the detection means comprise a speed sensor for detecting the travel speed, and wherein the control apparatus is configured to provide the control signal depending on the detected travel speed.

5. The agricultural soil cultivation unit in accordance with claim 1, wherein the detection means comprise a working depth sensor for detecting the working depth of the soil working tools of one of the tool rows; and wherein the control apparatus is configured to provide and/or to vary the control signal depending on the detected working depth.

6. The agricultural soil cultivation unit in accordance with claim 1, wherein the detection means comprise a soil quality sensor for detecting a soil quality, in particular a soil hardness or soil moisture; and wherein the control apparatus is configured to provide and/or to vary the control signal depending on the detected soil quality.

7. The agricultural soil cultivation unit in accordance with claim 6, wherein a/the control apparatus for providing a control signal for actuating the setting apparatus comprises selection means for selecting at least one operating parameter relevant to the diagonal pull from the group soil hardness, soil quality, soil moisture, tool engagement angle, and desired working depth, as well as presetting means for presetting the control signal depending on the selected operating parameter relevant to the diagonal pull.

8. The agricultural soil cultivation unit in accordance with claim 7, wherein the actuator of the setting apparatus actuable by external energy forms an adjustable end abutment that defines an end position of the lifting apparatus and/or an inclination position of the tool carrier frame in the lowered working position.

9. The agricultural soil cultivation unit in accordance with claim 8, wherein the actuator is integrated in the lifting apparatus for lifting the tool carrier frame into a headland position and/or into a transport position.

10. The agricultural soil cultivation unit in accordance with claim 9, wherein the actuator of the setting apparatus forms a floating piston that is displaceably received in a pressure medium cylinder of the lifting apparatus.

11. The agricultural soil cultivation unit in accordance with claim 10, wherein the floating piston is configured as a ring piston and is displaceably seated on a piston rod of the pressure medium cylinder between its main piston and a cylinder collar from which the piston rod emerges from the cylinder.

12. The agricultural soil cultivation unit in accordance with claim 10, wherein the setting apparatus has a pressure control means, in particular in the form of a pressure control valve, for controlling the filling of the pressure medium cylinder for determining the position of the floating piston.

* * * * *